(12) United States Patent
Cabedo-Deslierres

(10) Patent No.: US 6,746,079 B2
(45) Date of Patent: Jun. 8, 2004

(54) FOLDING SEAT ASSEMBLAGE TO ATTACH TO A LUGGAGE CART AND ITS DEPLOYMENT LINKAGE

(76) Inventor: Maria R. Cabedo-Deslierres, 2337 E. Brookdale Pl., Fullerton, CA (US) 92831

( * ) Notice: Subject to any disclaimer, the term of this patent is extended or adjusted under 35 U.S.C. 154(b) by 0 days.

(21) Appl. No.: 10/252,665

(22) Filed: Sep. 23, 2002

(65) Prior Publication Data

US 2003/0057752 A1 Mar. 27, 2003

Related U.S. Application Data

(60) Provisional application No. 60/324,752, filed on Sep. 25, 2001, and provisional application No. 60/401,592, filed on Aug. 6, 2002.

(51) Int. Cl.$^7$ .................................................. A47C 1/08
(52) U.S. Cl. .................. 297/250.1; 297/14; 297/60; 297/332; 297/344.21; 297/344.24; 280/20; 280/47.36
(58) Field of Search .................. 297/14, 60, 250.1, 297/255, 256, 256.12, 256.17, 332, 339, 59, 139, 141, 344.21, 344.24; 280/30, 47.34, 47.4, 47.38, 657, 47.41, 79.2, 37, 304.1, 47.25, 47.36, 47.371, 33.993

(56) References Cited

U.S. PATENT DOCUMENTS

| 508,961 | A | * | 11/1893 | Moss |
| 2,257,211 | A | * | 9/1941 | Willoughby |
| 4,460,215 | A | * | 7/1984 | Chamberlain et al. |
| 5,148,559 | A | * | 9/1992 | Morris |
| 5,374,073 | A | * | 12/1994 | Hung-Hsin |
| 5,547,205 | A | * | 8/1996 | de Rosario Sousa de Cabedo |
| 5,695,246 | A | * | 12/1997 | Tsai |
| 5,803,546 | A | * | 9/1998 | Yamazaki |
| 6,224,153 | B1 | * | 5/2001 | Vodinh |

* cited by examiner

Primary Examiner—Laurie K. Cranmer

(57) ABSTRACT

A seat with linkage attachable on either side of conventional luggage carts, on both sides, or to the backside, and once the push/pull handle rotates upward, positions itself vertical, for headroom clearance, and simultaneously deploys the seat to horizontal level, for seating, with an extension arm attached to, or part of, the bent projecting arm of the push/pull handle. The seated user's weight transfers directly to the floor by a U-shaped underseat support, preventing the cart from moving, and when the handle is down, for cart movement, the downward rotation retracts the seat up to stowed position with a torsion spring. The seat can be installed on a corner post of the cart structure, manually rotated to level position around the cart's corner, providing seating at either side, or back of the cart, and in stow position rests against cart structure. In all embodiments multiple stacking of carts is allowed.

2 Claims, 5 Drawing Sheets

Figure 1:
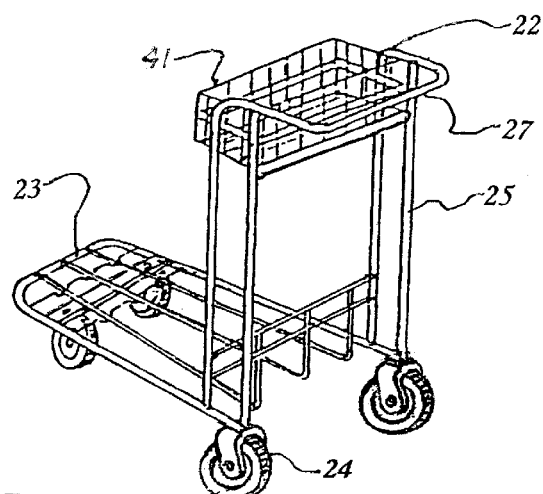

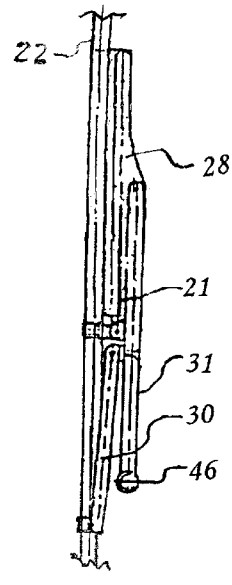
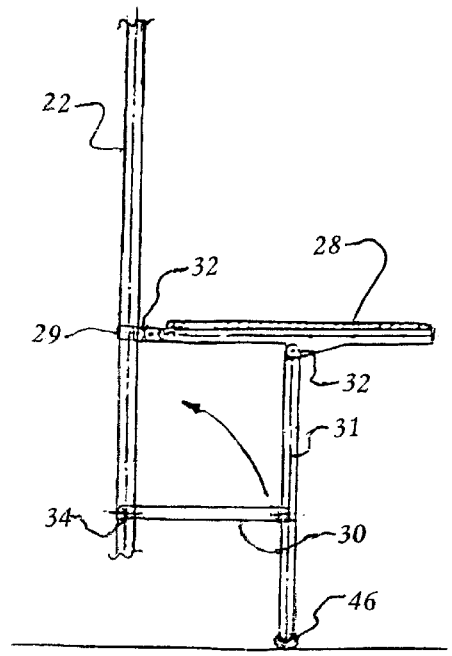
FIG. 4      FIG. 5
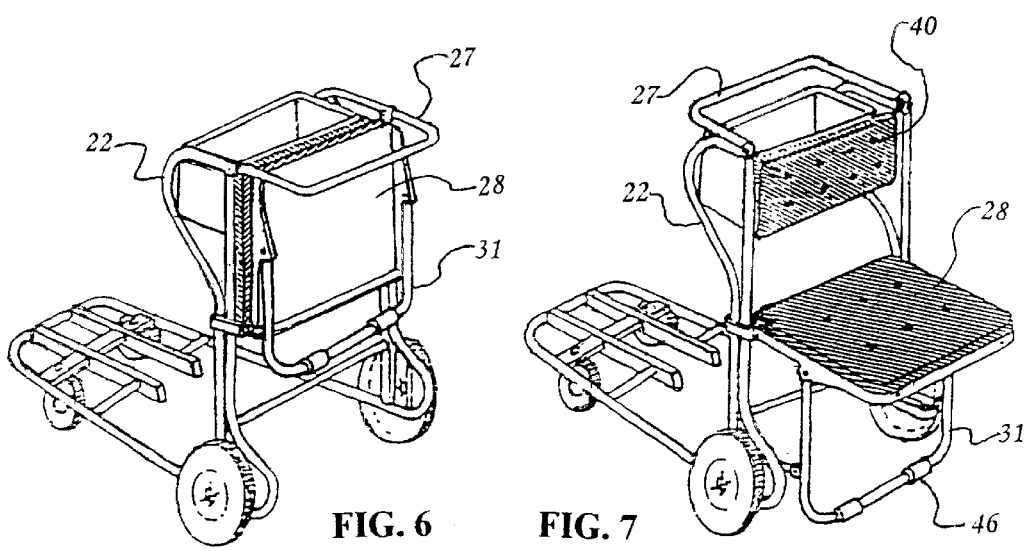
FIG. 6      FIG. 7

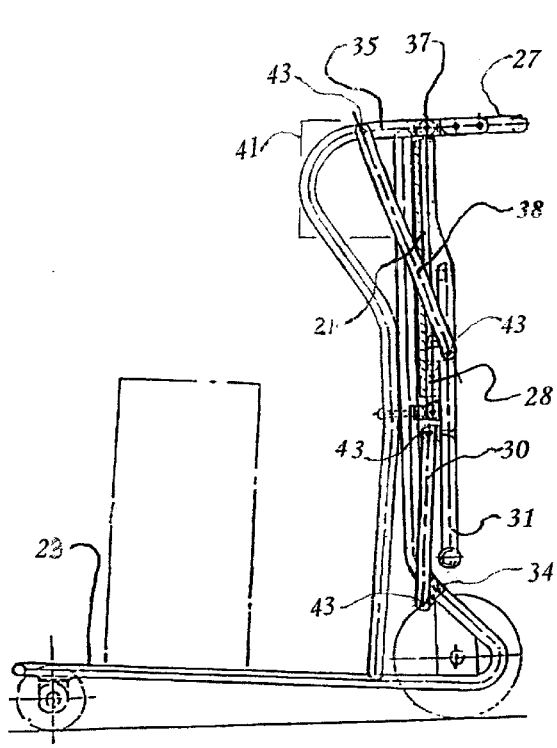
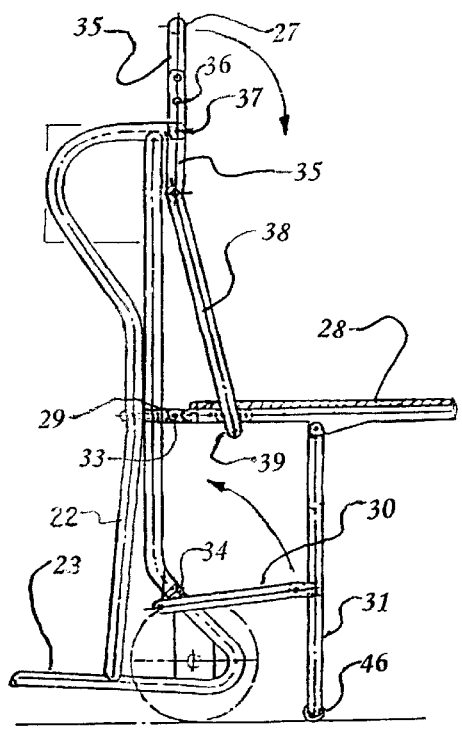
FIG. 8　　　　　FIG. 9
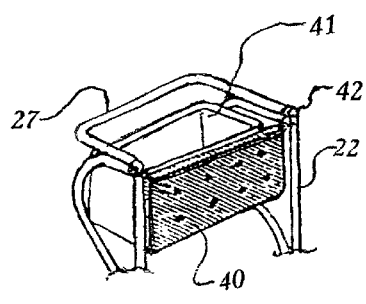
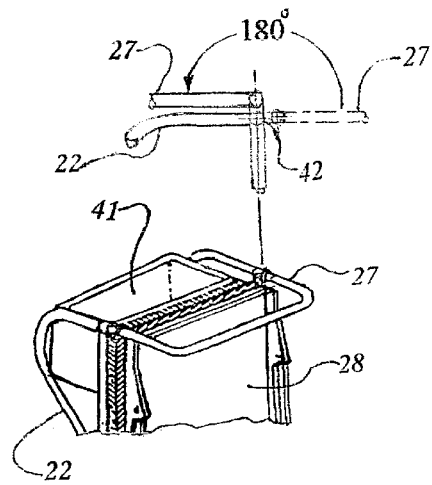
FIG. 10

US 6,746,079 B2

FOLDING SEAT ASSEMBLAGE TO ATTACH TO A LUGGAGE CART AND ITS DEPLOYMENT LINKAGE

CROSS-REFERENCE TO RELATED APPLICATIONS

This application claims priority to Provisional Patent No. 60/324.752 of Sep. 25, 2001 and Provisional Patent No. 60/401,592 of Aug. 6, 2002.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates and provides a means to a folding seat assemblage to be attached to any typical luggage cart that carries baggage, packages and goods for travelers at airports, as well as ship, train and bus terminals.

The invention utilizes the seat folding function and general arrangements of prior art, including U.S. Pat. No. 5,547,205 from the same inventor, and adds optional arrangements and attachments to ensure additional safety for the user, and permits practical means for modifying a wide range of cart designs in existence without requiring them to make major changes to their present design, in order to accomodate the use of a seat for a tired traveler. Optionally, if so desired , two seats may be added to the cart, used independently, one on each side.

Presently, almost all airports, as well as train, bus and ship terminals have available for the travelers luggage carts to help them convey their bagage about the terminals to ticket agents and various objectives while waiting for their transportation to arrive or leave. During these long waiting periods they are obliged to stand, sometimes without any place to rest during extended hours. Recent security problems have increased the wait time and produced long lines of passengers without access to chairs or seats during these periods. In addition, often times a flight would be cancelled or delayed as passengers with small children or the aged must wait standing tiredly since frequently there are no seats available and the carts they use have no provisions for resting during their long delayed wait.

The present invention has risen to mitigate and/or obviate the afore described disadvantage of the present luggage cart available to the public in that it contains only provisions for carrying passengers' suitcases, bags and parcels, but no provisions for the passengers' personal comfort, i.e., seating while waiting in the terminals.

Presently, the luggage carts available in the market at the various terminals contain no provisions for seating the tired waiting traveler. Some patents, however, show equipment handling systems including carts with seats, but all such patents are designed, operate and configured quite differently from the present invention, as will be discussed below:

U.S. Pat. No. 5,865,710—Wilson-Hyde, Step Aerobic Platform, shows a seat mounted on an aerobic platform and does not attach to a cart. It does not apply to the present invention.

U.S. Pat. No. 5,695,246—Chim Ho Thai, Seat Device Attached to Baggage Handcart, shows a seat supported by a single center tubular leg to a horizontal seat plate. The plate can rotate about a pin axis and is mounted on the two wheel L-shaped handcart frame whose lower projecting leg supports the baggage, and whose vertical leg contains two wheels at the bottom for wheeling the luggage and the top of this same member is where the traveler handles the handcart and tilts it at an angle to retain the loaded luggage. This patent does not apply to the present invention.

U.S. Pat. No. 6,237,924—Reiland et al, Shopping Cart with Internal Seat, shows a shopping cart with a seat and basket attached to the front end of the cart and does not apply to the present invention.

U.S. Pat. No. 5,826,892—Kratzenberg et al, Push Luggage Cart, shows a handcart that contains no seat and only a basket and does not apply to the present invention.

U.S. Pat. No. D315,904—Adamson et al, shows a luggage cart containing no seat and does not apply to the present invention.

U.S. Pat. No. 5,439,239—Chung-shiu Su, Collapsible Luggage Cart, shows a collapsible cart and does not apply to the present invention.

U.S. Pat. No. 4,733,877—Pastien, Cart Apparatus with Improved Handle, shows a cart with an improved handle design that does not apply to the present invention.

U.S. Pat. No. 4,381,870—Muellner, Versatile Cart Apparatus, shows a cart that contains a fixed aft facing seat or tray and the seat is mounted in a manner that the vehicle can move with the person on it and will roll. The seated person seats high on the cart frame. This patent does not apply to the present invention.

U.S. Pat. No. D263,127—Muellner, Luggage Cart with Adult Seat, shows the design of a cart with an adult seat fixed and mounted in the cart frame in a manner that the person seats very high on it, and the cart can move or roll while the person is seating. This patent does not apply to the present invention.

U.S. Pat. No. 5,887,927—Kurek III, Folding Handle Device, shows a folding device that rotates around the eye of a vertical stud that contains a compression spring to retain the handle in the vertical or horizontal position, and it does not apply to the present invention.

U.S. Pat. No. 5,547,205—Cabedo, Luggage Cart with Attached Seat, shows a four wheel cart that contains a folding seat mounted on the cart structure. The seat is manually rotated to the stow position and the push handle is rotated manually to a vertical position for head clearance. The function of both operations are not connected in the above Patent, while the present invention interconnects these two functions: the up and down movement of the seat, and the rotation of the handle. In the present invention, when optionally a seat is installed on the back of the cart, it is rotated up and down with the cart push handle. In the above Patent the seat is plain, while in the present invention the seat is spring loaded, helping to lift it upward to its stow position, and the rotating push handle is different as it has an extension arm to interface with the seat lift linkage and also contains a double pivot capability to permit laying over 180 degrees forward to clear a container or basket whenever same is part of the cart. In addition, in one embodiment of the present invention, it also shows one or two seats on the side of the cart. In the Cabedo Patent, the seat is supported by two vertical legs interconnected with a cross bar, while the present invention utilizes a single bent support for the seat load. The Cabedo Patent guide link slides up and down the cart structure frame, while the present invention utilizes a fixed pivot to retain the horizontal guide link. There is also a major difference on how to support the weight on the seat: the Cabedo Patent supports the load with a diagonal truss member and two vertical tubes, while the present invention utilizes only a guided bent vertical tube to support the seat. The basics of the two inventions are different and the referred to Cabedo Patent does not apply to the present invention.

U.S. Pat. No. 4,460,215—Chamberlain et al, Folding Seat Assembly, shows a folding seat assembly that folds against a wall, and the linkage and folding hinge assembly does not apply to the present invention.

U.S. Pat. No. 2,257,211—V. Willoughby, Seat, shows a seat that folds against a wall and the hinge assembly and support frame are mounted differently to the seat and in the folded up position the seat is locked up against the wall in such way that it does not apply to the present invention.

U.S. Pat. No. 5,213,360—Chin-Feng Lin, Push Car, shows that this patent is primarily a two wheel frame that contains a flexible seat for a baby on a luggage hand car, and does not apply to the present invention.

U.S. Pat. No. 5,374,073—Hung-Hsin, Tractive Baggage Handcart, shows a two wheeled handcart that comprises a travel case, a tractive retractable device on back of said travel case, a tie belt and a foldable chair, and it does not apply to the present invention.

U.S. Pat. No. 5,161,811—Cheng, Trolley with a Foldable Seat, shows a foldable seat assembly mounted on a hand cart and the seat support assembly contact the soil by means of two pair of stands, and does not apply to the present invention.

U.S. Pat. No. 3,170,709—J. T. Shackel, Utility Carts, shows a seat mounted and fixed on the front part of an utility cart and does not apply to the present invention.

U.S. Pat. No. 1,869,365—G. F. Corduan, Chair, shows a metal folding chair not attached to a wheeled baggage cart and which in turn, the parts, design and construction do not apply to the present invention.

U.S. Pat. No. 1,692,930—E. W. Cummings, Foldable Service Board, shows a service board folding against the wall and the configuration, parts and foldable system do not apply to the present invention.

German Patent #911173—Hubner, Foldable Garden Chair, shows a foldable chair that runs in a slot, and it does not apply to the present invention.

BRIEF SUMMARY OF THE INVENTION

The present invention provides a means for the attachment of a folding seat that can be attached to the side, or to the back, of any typical baggage cart, and provides a means for convenient automatic positioning of such seat and the necessary rotation of the push/pull handle to achieve needed head room.

The lateral seat, when rotated down to the seated deployed position, has an extended support that rotates from the bottom side of the seat, outward and down to support the weight of the seated user, and conveys this weight load directly to the floor level that the baggage cart rests upon. This extension of the support is positioned vertically beneath the seat by a rotating guide link attached to the luggage cart frame. The seat rotates to the horizontal level seated position, and rotates to the stowed vertical flat against the cart structure position by two or more hinge fittings that attach to the baggage cart structure. The extended load support beneath the seat is attached to the bottom of the seat near its center with two fittings that provide rotational capability to the seat support. The embodiment of this support is shown as a U-shape bent tube with the two vertical legs engaging the previous discussed rotational fittings. The two guide links are attached at one end to the luggage cart support structure, and at the other end, to the two vertical legs of the extended U-shape bent tube seat support. The seat is spring loaded to the stowed position so that the baggage cart is at all times ready to be moved throughout the terminal, by the user, when needed. This spring lifts the seat off the floor as soon as the user stands up, but the seat is always ready to be manually moved down to the deployed position, by the user, whenever needed, by downward pressure. When seated, the user's weight on the seat retains it in the horizontal level position. The light weight spring assemblies, in the seat hinge, require a light load to overcome their return to stowed baggage cart mobile position.

As a second embodiment, the seat assemblage can be mounted on either side of any typical conventional luggage cart now in use at the terminals. If desired, a seat assemblage can be installed on both sides of the cart and provide seating for more than one person.

As a third embodiment, this spring seat assemblage can also be attached to the back of the cart and for such purpose the present invention also provides a means for rotation of the push handle, which rotation is provided by a mechanism that simultaneously moves the seat from the stowed up position to a deployed ready-to-seat position. This is necessary for the back seat assembly embodiment inasmuch as the horizontal push handle, projecting aft from the cart, interferes with the head room of the seated user. Rotation of the handle up, and out of the way, provides a means for also deployment of the spring driven seat to its operating position. This invention provides the means for combining the rotation of the handle and rotation of the seat from the folded up position to the extended down seating position in one sole operation, thus linking together both operations with a simple linkage that can be attached to any sort of cart or equivalent. The present invention mitigates and/or obviates the afore described head room disadvantage and improves the fold up function and packaging of the folded seat in the folded up position, ensuring that when the handle is rotated down, the seat will be folded up into its stowed position and the legs of the assembly have been lifted up, and off the floor, and will not drag when the cart loaded with luggage is pushed around the terminal. As the said handle is rotated from the horizontal level position to the vertical head clearance position, two extension arms attached to the push handle, and extending beyond the said handle rotation pivot, also rotate. When the said push handle rotates upward, the extension arms, being on the opposite side of the pivot, rotate downward around the said pivot. Attached to the end of each extension arm is a long link that connects to two seat fittings, one on each side of the seat. Each fitting is firmly attached to the seat frame and at a reasonable distance away from the seat pivot hinge, in order to provide good leverage for movement of the seat in a rotational direction. As the push handle is rotated upward, the extension arm rotates downwards and pushes the long side links downward which, in turn, drive the seat from the stowed vertical attitude to a horizontal level attitude, for traveler seating accomodation. In reverse, the push handle being rotated downward, from its upright vertical position, in turn rotates the two extension arms upward and pulls on the long links attached at their ends, and by pulling on these links they pull upward on the seat assembly and rotate it to a stowed vertical position. Rotation to this position lifts the seat vertical legs upward off of the floor, and stows them in a vertical attitude, folded under the stowed seat assembly in a compact position. Installed within the seat hinge is the spring device. The seat and a seat back board contain cushing provisions for comfort of tired traveler. With the seat in the stowed up location, the cushioned seat and the cushioned back are brought together face to face. To ensure that the seat is secured in the folded up position, the linkage travels over-center to latch the seat in the upright stow attitude to prevent the seat and handle from being rotated accidentally. The cart user merely releases the overcenter lockup condition by pulling on the handle when he wishes to extend the seat, or fold it up for cart with luggage movement.

BRIEF DESCRIPTIONS OF THE DRAWINGS

FIG. 1—Shows a typical luggage cart presently utilized in air, train and bus terminals.

Figure 2:
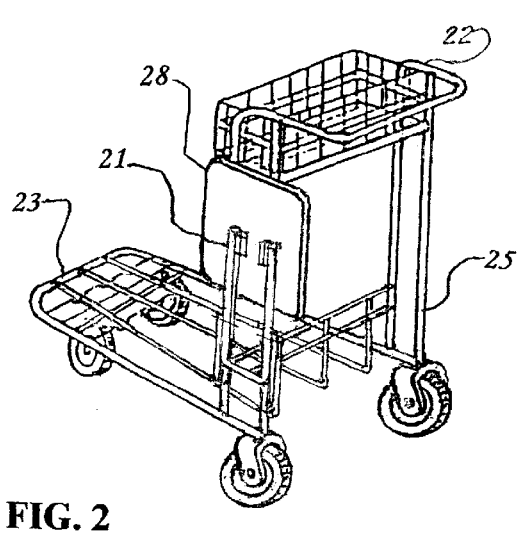

FIG. 2—Shows a luggage cart with attached seat in the stowed folded-up side position, with the support member attached to the center underside of the seat.

Figure 3:
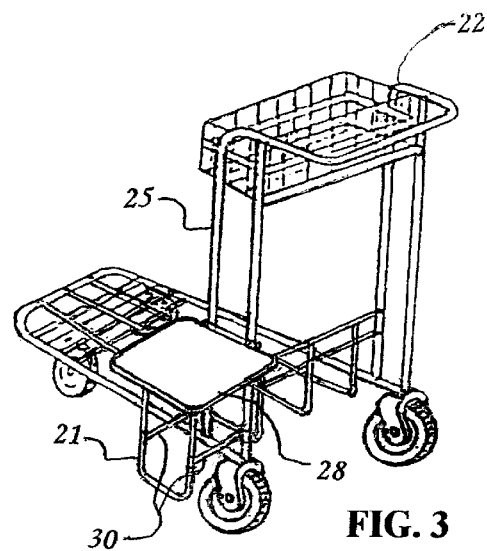

FIG. 3—Shows a typical cart containing the lateral mounted seat in the deployed position. The seat is attached to the cart's vertical support structure and support posts that frame the cart.

FIG. 4—Presents the folded-up seat assembly as it would be attached to any typical luggage cart.

FIG. 5—Shows the components of the fold-up seat in the deployed position for seating.

FIG. 6—Illustrates the fold-up seat installed on the backside of a typical luggage cart, in the folded-up arrangement.

FIG. 7—Provides an illustration of the fold-up seat on a cart, in the deployed position, showing the push/pull handle modified to provide both head room for the seated traveler and access to the cart's basket.

FIG. 8—Illustrates the cart with the seat in the back folded-up position and provides the components for a linkage that folds-up the seat and/or deploys it, simultaneously, when the push/pull handle is rotated.

FIG. 9—Illustrates the cart with the seat in the deployed position and shows the linkage as the push/pull handle is rotated up for head clearance, and simultaneously deploys the seat.

FIG. 10—Illustrates a modification of the push/pull handle and shows that the handle can be rotated 180° with coupling fitting attached to the two ends of the handle.

Figure 11:
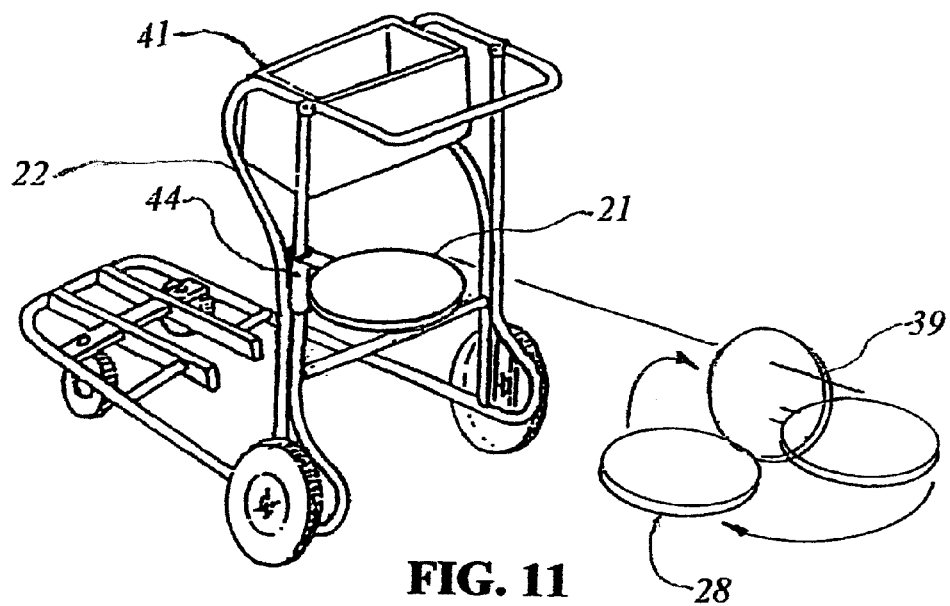

FIG. 11—Illustrates a seat mounted on a cart's corner post and how the seat can be rotated laterally and be folded up against the cart structure.

Figure 12:
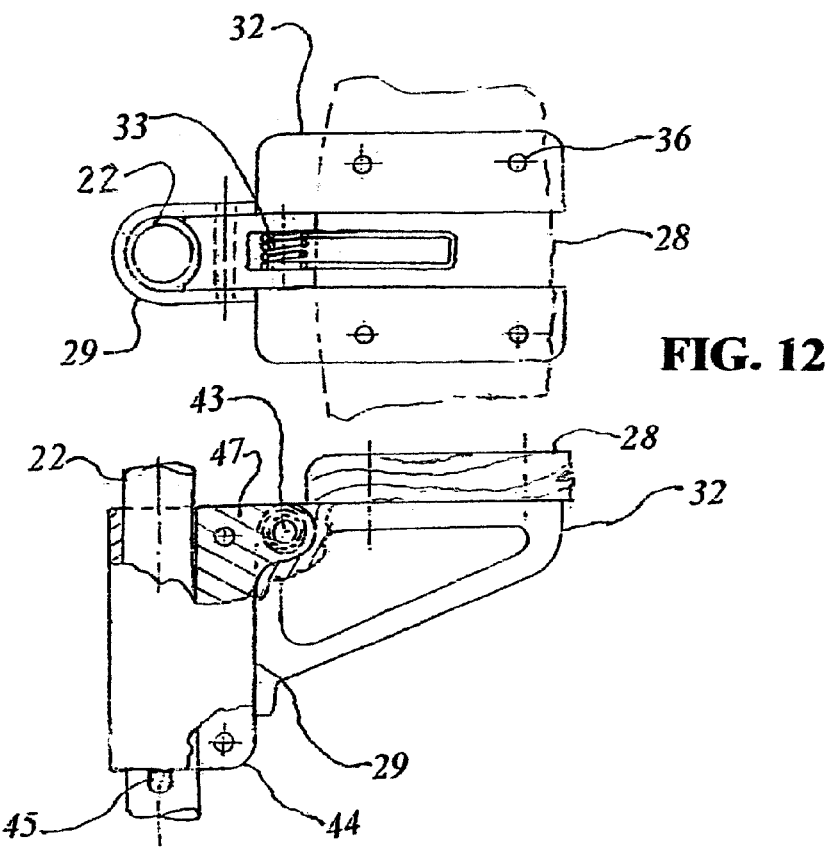

FIG. 12—Provides a detail of the clamp-on multiple hinge fitting on a structural corner post and shows the seat rotating laterally around the post in a level horizontal position, and how it supports the weight of the seated traveler.

Figure 13:
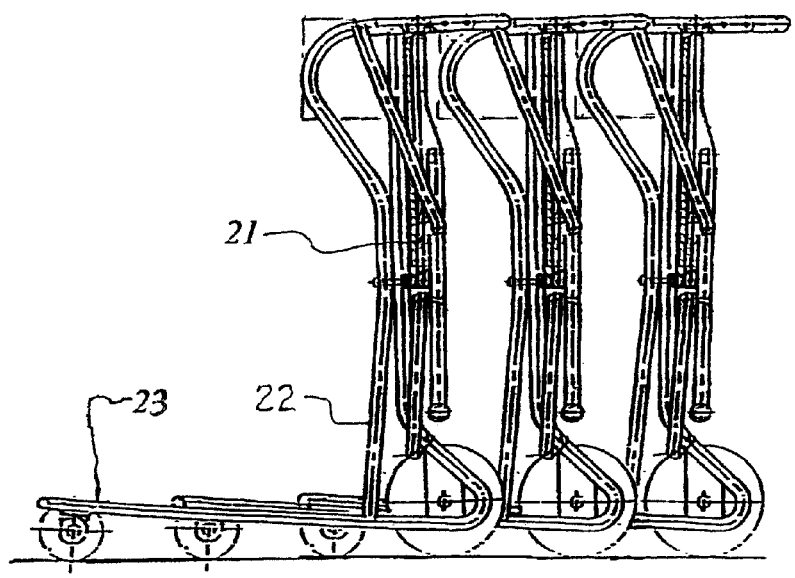

FIG. 13—Illustrates how typical luggage carts with folded-up seats in the back position can be stacked together for storage and dispensing.

Figure 14:
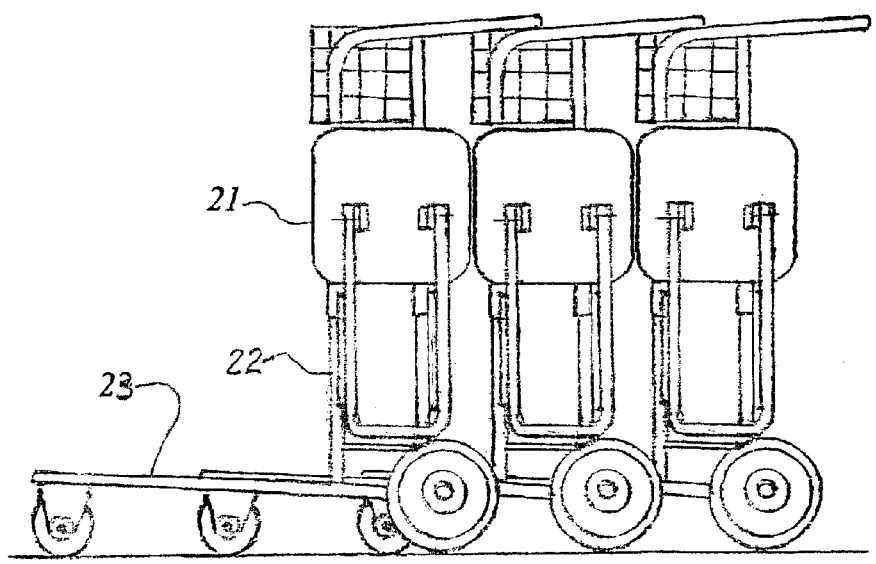

FIG. 14–Illustrates how typical luggage carts with folded-up seats in the side position can be stacked together for storage and dispensing.

DETAILED DESCRIPTION OF THE INVENTION

Referring to the Drawings and initially to FIG. 1, the invention comprises generally of a foldable seat assembly (21) that can be installed on any conventional luggage cart (22) that contains a relatively level platform or base frame (23), that in turn contains wheels (24) for moving the said cart with baggage, and having a vertical tubular support structure that frame the cart (25), at the top of which there is a rotating push/pull handle (27) that provides a means for the traveler to push a said mobile luggage cart (22) containing the baggage, packages or equivalent, stacked upon the said base frame (23) around the terminals, parking lots and ticketing counters, while servicing the incoming or outgoing travelers. The said tubular vertical support structure (25) generally holds a container or basket (41) for holding small items or hand carried possessions. The afore description represents the basics of the luggage carts used at terminals throughout the world at airports, train and ship facilities.

The present invention attaches to the said luggage cart (22), and provides it with one or two seats (28) for use by tired travelers, and is characterized by a folding seat assembly (21) that can be rotated about a hinge attached to the structure of the said luggage cart (22) and can be installed on either side, both sides or backside of said luggage cart. The preferred embodiment of this invention is to install the said foldable seat assembly (21) on the side of the said cart (22).

The said foldable seat assembly is comprised of a said seat (28) shown in FIG. 2 that can be round, square, rectangular or any shape, and is hinged to the said cart's structure frame with a clamped-on or interface hinged fittings (29) that can be clamped, bolted, riveted or welded to said cart's tubular vertical support structure (25). The said luggage cart (22) with the said folding seat assembly (21), in the extended down horizontal seating position, is shown in FIG. 3. When said seat (28) is deployed down to this said seat position, a pair of guide links (30), one in each side of said cart, guides said seat to the correct horizontal level position during rotation from the stowed-up vertical position to ready-to-seat horizontal position. The said guide links (30) are attached at one end to the said cart's structure, and at the other end to the seat tubular support frame member (31), and at both attachment points the said guide links (30) can rotate as the said folding seat is rotated down. The said guide links (30) being attached to the said tubular support member (31) positions it at the center and directly beneath the said seat (28) in a vertical attitude for supporting the weight of the seated user. The said seat support member (31) safely transfers the seated person's weight in compression directly down to the floor and prevents movement of the said cart when the said seat is being occupied. FIG. 4 shows a side view of the said seat assembly attached to the said cart's vertical structure in the folded up stowed position and FIG. 5 shows the side view of the said seat assembly (21) hinged down to the said seating position.

The said seat (28) contains internal stiffeners to make the seat rigid, or it is made of a material inherently rigid such as wood, metal or plastic for strength from bending and for support the weight of a person. Said support member (31) is attached to the said seat (28) at a pair of fittings (32) that permits the said support member (31) to rotate vertically from the seating position to the stowed position, and vice-versa. The said folding seat contains provisions for attachment of said hinge fittings (32) that are clamped to the cart's said structure and contain a torsion spring (33) that returns the said folding seat to the said upright stowed position when the user leaves the seat. This ensures that the seat is returned to the stowed position and ensures that the said tubular bent support member (31) is lifted off the floor, and permits movement of the said cart (22) On the bottom of the said tubular support member (31) there are rubber pads (46) that contact the floor and help prevent movement of the said cart and the scratching of the floor when the said seat is occupied. Said guide links (30) ensure the said seat support is positioned in the vertical underneath the said seat (28), and the said seat is level. The said guide links (30) are attached to the said cart structure with clamp-on attachment fittings (34) that permit rotation of said guide links. When the said folding seat assembly (21) is installed on either side of the said cart, there is head room for the seated user. When the said folding seat assembly (21) is installed on the back side of the said cart (22), at a position shown in FIG. 6, the said cart's push/pull handle (27) interferes with the head room of the seated user, and thus is rotated to a vertical position for head room clearance. FIG. 7 shows the said folding seat assemblage in the said down position, ready for the user to sit upon the seat. Inasmuch as the said cart's push/pull handle (27) must be rotated out of the way in this embodiment of the invention, the rotation movement of the said handle is used to automatically deploy the said seat to the said down position and to automatically retract it said seat to said up stowed position. The linkage shown in FIG. 9 and FIG. 8 illustrates the arrangement in the two said positions.

A pair of extension arms (35) is attached to the two ends of the push/pull handle with screws (36) and extends the movement of rotation around pivot fitting joints (37) installed in the said handle assembly (27) so that when the said handle is rotated upward to the head clearance position the attached said extension arms (35) projecting ends, being forward of the said rotation pivots (37), rotate downward, and a pair of long connecting links (38) attached to the projecting ends of the two said extension arms is moved downward. Since the other ends of the said long links (38) are connected to the said seat (28), the said seat is rotated downward to the level horizontal seating position for user's use. The said long connecting links (38) are attached to the said seat (28) at a location (39) that provides good leverage to raise and lower the said seat around the said hinge fittings pivot (29), each of which contains a said torsion spring (33) that raises the said seat bent support member (31) off the floor. A padded seat back (40) is attached to the said luggage cart (22) between the two said upright structural members on the said cart. When the said seat (28) is rotated to the upward stowed position, the said seat (28) folds against the said seat back (40) as shown in FIG. 10. For those embodiments that do not use the said push/pull rotation handle for said seat fold up, but still require head room clearance, FIG. 10 illustrates how the said handle is rotated forward and out of the way. To ensure that the said rotation function of 90° of the said push/pull handle (27) does not interfere with the function of placing items in cart's container or basket (41), two coupling assemblies (42) are inserted in the interface pivot joint attached to each end of the push/pull handle and to the said luggage cart structure (22). This said coupling assemblies (42) contain two fitting rotation pivot points (43) on the same axis attached to each end of said push/pull handle, that each provide an extra 90° of rotation capability to permit the said handle (27) to rotate from an aft horizontal position for a total forward horizontal position of 180°, as shown in FIG. 10, and places it out of the way for placing posessions into the said container or basket (41).

An additional embodiment of the invention is shown in FIG. 11 that utilizes this said handle arrangement and installs the said folding seat assembly (21) on to said cart's corner suport post structure on the said luggage cart (22). The said seat assembly (21) is clamped, bolted, riveted or welded to the said corner support post structure with a multiple hinge fitting (44) that has provisions for seat folding up and down from the stowed vertical position to the level horizontal user position, and has rotational capability around said corner post for movement of the seat when it is in a level horizontal position. This permits the seat to be located both on either side of the said luggage cart for lateral seating positions, and or be moved around to the back of said luggage cart for back seating position as shown in FIG. 11

The said multiple hinge fitting (44) is shown in FIG. 12 contains a hinge type pivot to rotate around said corner post and provides the seated user the availability to position him or herself in several optional positions while waiting and watching the baggage, resting on the said luggage cart (22). In this embodiment the said seat is manually raised and lowered and rotated to the desired operating positions. The said multiple hinge assembly contains a said torsion spring (33) to raise the said seat, when it is not occupied, to the stowed position. This said multiple hinge assembly supports the said seat by transferring the weight load of the seated user to the cart's supporting structure. The said multiple hinge fitting (44) contains shoulder stops (45) to prevent the said seat from rotating too far beyond the correct operational positions.

The embodiments presented provide for unbalanced seating loads and can safely accommodate sizeable body weight without structural failure to either the cart structure or the said luggage cart components.

All of the unique embodiments for attachment of a said folding seat assembly (21) to a said luggage cart (22) allow the said carts to be stacked in tandem, as shown in FIG. 13 related to said seats in the said stowed-up back location, and in FIG. 14 when said seats are stowed-up in said lateral seat position. In both embodiments said luggage carts, with said seats, are ready for storage, dispense, and mobility of the said carts around the terminal.

Although the description above contains many specifications, these should not be construed as limiting the scope of the invention, but as merely providing illustrations of some of the present embodiments of the invention. Further objectives and advantages of all embodiments of the present invention will become apparent and reside in the details of construction, operation and enclosed drawings, and more fully herein described and claimed, reference being added in the accompanying drawings forming a part hereof.

List of Part Numbers
21—Folding seat assembly
22—Luggage cart
23—Platform or base frame
24—Wheels
25—Vertical tubular structure
26—Mobile baggage cart assembly
27—Handle assembly (push/pull)
28—Seat
29—Hunge fitting (clamp on)
30—Guide link
31—Tubular frame
32—Fitting (seat)
33—Torsion spring
34—Guide link attachment fitting
35—Extension arm
36—Screws
37—Pivot fitting
38—Long link
39—Location
40—Seat back
41—Container/basket
42—Coupling assembly 43—Pivot points
44—Multiple hinge fitting
45—shoulder stops
46—Rubber pads

I claim:

1. A folding seat attached to a luggage cart, comprising:

a seat pivotally attached to structural support members that frame the luggage cart, said seat attached with interface hinge fittings that can be clamped, bolted, riveted or welded to the structural support members of the luggage cart, said seat, when pivoted to a stowed position, will stand upright against the frame of said cart and when pivoted to a deployed position will extend horizontally;

a U-shaped support member attached at or near the center of the seat that can rotate from a supporting position depending perpendicular under said seat when said seat is in the deployed position, to a retracted position flat against the seat when the seat is in the stowed position;

a pair of guide links that guide the U-shaped support member during rotation from the supporting position to the retracted position;

a torsion spring at said interface hinge fittings biasing said seat to the stowed position;

a linkage that rotates said seat from said stowed position to said deployed position, wherein said linkage comprises:

a U-shaped push/pull handle having a cross bail and two legs, a pair of extension arms, each having two ends, attached to each leg of said push/pull handle at one of the ends, a pair of long connecting links, each with pivot joints at each end, wherein one end of each long connecting link is pivotally attached to the other end of the respective extension arm, and the other end of each of said long connecting link is pivotally attached to said seat; and wherein rotation of the push/pull handle from a horizontal position to a vertical position provides head room for a seat occupant, and automatically deploys said seat from said stowed position to said deployed position.

2. A folding seat for a luggage cart wherein said seat can be actuated from a vertical stowed position to a horizontal deployed position, wherein in the stowed position multiple carts can be nested in tandem; said seat is attached to a corner post of said luggage cart, and can be rotated around said corner post to a deployed position to the side or the rear of the luggage cart;

a multiple hinge that at one end is rotatably clamped to and around said corner post, and at another end is attached to the center of the underside of said seat;

a support fitting fixed to said multiple hinge, wherein said support fitting flanges out to support an underside of said seat, and contains a hinge to permit said seat to rotate vertically to said stowed position; and a torsion spring biases the seat to the stowed position, and wherein in the stowed position multiple carts can be nested in tandem.

* * * * *